United States Patent
Nishida

(10) Patent No.: US 10,007,237 B2
(45) Date of Patent: Jun. 26, 2018

(54) CONTROL DEVICE FOR INVERSE RESPONSE SYSTEM

(71) Applicant: Kobe Steel, Ltd., Hyogo (JP)

(72) Inventor: Yoshiharu Nishida, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 164 days.

(21) Appl. No.: 14/433,531

(22) PCT Filed: Oct. 15, 2013

(86) PCT No.: PCT/JP2013/078018
§ 371 (c)(1),
(2) Date: Apr. 3, 2015

(87) PCT Pub. No.: WO2014/061683
PCT Pub. Date: Apr. 24, 2014

(65) Prior Publication Data
US 2015/0227119 A1    Aug. 13, 2015

(30) Foreign Application Priority Data

Oct. 17, 2012 (JP) .................................. 2012-229926

(51) Int. Cl.
*G05B 11/36* (2006.01)
*G01M 17/02* (2006.01)
*B60C 1/00* (2006.01)

(52) U.S. Cl.
CPC ................ *G05B 11/36* (2013.01); *B60C 1/00* (2013.01); *G01M 17/022* (2013.01)

(58) Field of Classification Search
CPC .......... G05B 11/42; G05B 7/02; G05B 11/36; B60C 25/002; G01M 17/02
See application file for complete search history.

(56) References Cited

U.S. PATENT DOCUMENTS

| 2006/0176605 A1* | 8/2006 | Baek | G11B 5/59627 360/77.04 |
| 2009/0005886 A1* | 1/2009 | Gao | G05B 5/01 700/29 |
| 2011/0066291 A1 | 3/2011 | Morita et al. | |

FOREIGN PATENT DOCUMENTS

| JP | 2006-215993 A | 8/2006 |
| JP | 2010-122006 A | 6/2010 |
| WO | 2010/024194 A1 | 3/2010 |

OTHER PUBLICATIONS

The extended European search report issued by the European Patent Office dated Aug. 1, 2016, which corresponds to European Patent Application No. 13847899.5-1807 and is related to U.S. Appl. No. 14/433,531.

(Continued)

*Primary Examiner* — Nathan L Laughlin
(74) *Attorney, Agent, or Firm* — Studebaker & Brackett PC

(57) ABSTRACT

Provided is a control device (1) for controlling a control target that comprises an inverse response system (2) having inverse response characteristics, i.e., in which the initial response rocks in the inverse direction from the input change direction. The control device (1) comprises an inverse response compensation system (5) that compensates for the inverse response characteristics in the control target. This inverse response compensation system (5) is configured to calculate a comparison value for the output of the control target and the output of a control target from which a portion or all of the unstable zeros have been removed and feed the calculated comparison value back to the input side of the control target.

3 Claims, 4 Drawing Sheets

(56) References Cited

OTHER PUBLICATIONS

S. Mukhopadhyay; "Module 3 Process Control, Lesson 16, Special Control Structures: Predictive Control, Control of Systems with Inverse Response"; Oct. 13, 2006; pp. 1-11; XP055288138; http://nptel.ac.in/courses/108105063/pdf/L-16(SS)(IAC) ( (EE)NPTEL).pdf.
S. Mukhopadhyay; "Lecture 15 Time Delay Systems and Inverse Response Systems"; May 19, 2008; pp. 1-2, You Tube; www.youtube.com/watch?v+S1vIlsydrTY.
Koichi Iinoya et al.; "Inverse Response in Process Control"; Jul. 31, 1962; pp. 39-43; vol. 54; No. 7; ACS Publications; http://pubs.acs.org/doi/pdf/10.2021/ie50631a007.
Kenny Uren et al.; "Predictive PID Control of Non-Minimum Phase Systems"; Advanced in PIDS Control; Sep. 6, 2011; pp. 9-12; XP055288201; InTech.
International Search Report; PCT/JP2013/078018; dated Dec. 24, 2013.
Written Opinion of the International Searching Authority; PCT/JP2013/078018; dated Dec. 24, 2013.

\* cited by examiner

INVERSE RESPONSE SYSTEM (NON-MINIMUM PHASE SYSTEM)

CONTROL DEVICE FOR INVERSE RESPONSE SYSTEM

TECHNICAL FIELD

The present invention relates to a technology of controlling a control target having inverse response characteristics (inverse response system).

BACKGROUND ART

In a tire running test apparatus disclosed in PTL 1, for example, a belt wound around a pair of drums moves side to side during the tire test or deviates from the appropriate position in some cases. Thus, the tire running test apparatus controls the belt position while the angle at which the drums rock is made variable after the belt position has been measured.

In a control system such as this tire running test apparatus, the belt, which is a control target, may move in the direction of a command value after firstly moving in the inverse direction at the initial timing of the control due to effects such as the effect of the elasticity of the belt (portion indicated by A in FIG. 1). Such a system that responds so that an output is firstly deflected in an inverse direction at the time of control is called an inverse response system. If the inverse response system has linear dynamic characteristics, the inverse response system is a non-minimum phase system that has a transfer function including unstable zeros.

As illustrated in FIG. 2, when illustrated in a block diagram, the inverse response system can be separated into a minimum phase system P(s) and unstable zeros Z(s).

Here, a polynomial is referred to as a minimum phase polynomial when the real parts of all the roots that satisfy the polynomial=0 are negative. A system that is a linear system and in which both the denominator polynomial and the numerator polynomial of a transfer function are minimum phase polynomials is referred to as a minimum phase system. In other words, a minimum phase system is a stable system expressed by a transfer function in which all the zeros (roots of numerator polynomial=0) and the poles (roots of denominator polynomial=0) are stable (real parts are negative). Meanwhile, unstable zeros are zeros that are unstable and include a positive real part and a system expressed by a transfer function including unstable zeros is referred to as a non-minimum phase system. When unstable zeros, which are slower than stable poles, are included, the non-minimum phase system exhibits inverse response characteristics. For separation of the inverse response system into a minimum phase system P(s) and unstable zeros Z(s), when not all the unstable zeros are integrated into Z(s) but at least one of the unstable zeros is integrated into Z(s) and the remaining unstable zeros are left in P(s), P(s) does not become a minimum phase system but becomes a non-minimum phase system.

Examples of a technology for controlling such an inverse response system include a device disclosed in PTL 2. A device for suppressing pulsation of an electric motor disclosed in PTL 2 performs Fourier-transform on pulsation detection values of an electric motor driven by an inverter, detects pulsation components of an appropriate frequency in the form of two Fourier coefficients, and performs learning control using a learning controller so that the pulsation is suppressed. Thus, the device for suppressing pulsation suppresses pulsation by superimposing the learned pulsation compensation current on a d-axis current command value, a q-axis current command value, or both d-axis and q-axis current command values of a rotating system of coordinates in a vector control. In the device for suppressing pulsation, the learning control system for pulsation suppression with detection of the two Fourier coefficients is formed in a complex vector plane and the device includes means for calculating the pulsation compensation current.

CITATION LIST

Patent Literature

PTL 1: Japanese Unexamined Patent Application Publication No. 2010-122006
PTL 2: Domestic Re-publication of PCT International Publication for Patent Application No. 2010/24194

SUMMARY OF INVENTION

Technical Problem

The inverse response system described above moves, at the initial timing of response, in the direction opposite to the direction of an input, and thus the inverse response system has low controllability. Particularly, in the case where a system, despite being an inverse response system, exhibits oscillatory behavior as illustrated in FIG. 3 (when denominator poles of a transfer function include oscillatory poles in which "imaginary part>> real parts"), the system has lower controllability.

FIG. 4 is a block diagram of PID control on an inverse response system that exhibits oscillatory behavior as illustrated in FIG. 3. Such a control system is also disclosed in FIG. 7 or other part of PTL 2.

FIG. 5 shows results obtained after the control system in FIG. 4 is controlled (step response). In the control system of FIG. 4, the effect of the inverse response yields almost no D gain (derivative gain), whereby the oscillatory behavior cannot be suppressed. Thus, a P gain (proportional gain) cannot be increased either and the control system is thus mainly constituted by an I gain (integral gain). Consequently, the response is very slow and even so, the response exhibits an oscillatory response wave form.

In summary, the inverse response system has the following control problems.

(1) Since an inverse response opposite to the change direction input to a control target occurs firstly, the inverse response system has very low controllability.

(2) Although an application of D control (derivative control) is attempted to control a non-minimum phase system including an inverse response system, a D gain that changes the control input in accordance with the change in an output wave form functions in an unstable direction in the above-described inverse response. Thus, almost no D gain can be provided. Particularly, an inverse response system that exhibits oscillatory behavior as illustrated in FIG. 3 is unable to be subjected to oscillation control using the D control.

(3) Since it is not possible to perform oscillation control using the D control, P control (proportional control) can be only performed within a range within which oscillation is not excited, whereby the main control of the control system is left to I control (integral control). However, improvement of responsiveness using the I control is limited, whereby only a very slow control response is obtained.

In view of the above problems, an object of the present invention is to provide a control device that can reliably control an inverse response system.

Solution to Problem

To accomplish the above object, the present invention provides the following technical means.

A control device for an inverse response system according to the present invention is a control device that controls a control target having inverse response characteristics that cause initial response in a direction opposite to a change direction of an input. The control device includes an inverse response compensation system that compensates for the inverse response characteristics of the control target. In the control device, the inverse response compensation system is configured to calculate a comparison value between an output of the control target and an output of the control target from which at least one or all of unstable zeros is/are removed and to feed the calculated comparison value back to an input side of the control target.

Preferably, the control target is a tire running test apparatus that includes an endless belt wound around a pair of drums and a test tire disposed so as to roll over the belt, and a rocking angle of the drums or a rocking force of the drums serves as an input of the control target and a position of the belt serves as the output of the control target.

Advantageous Effects of Invention

The control device according to the present invention is capable of reliably controlling an inverse response system.

DESCRIPTION OF EMBODIMENTS

Figure 1:
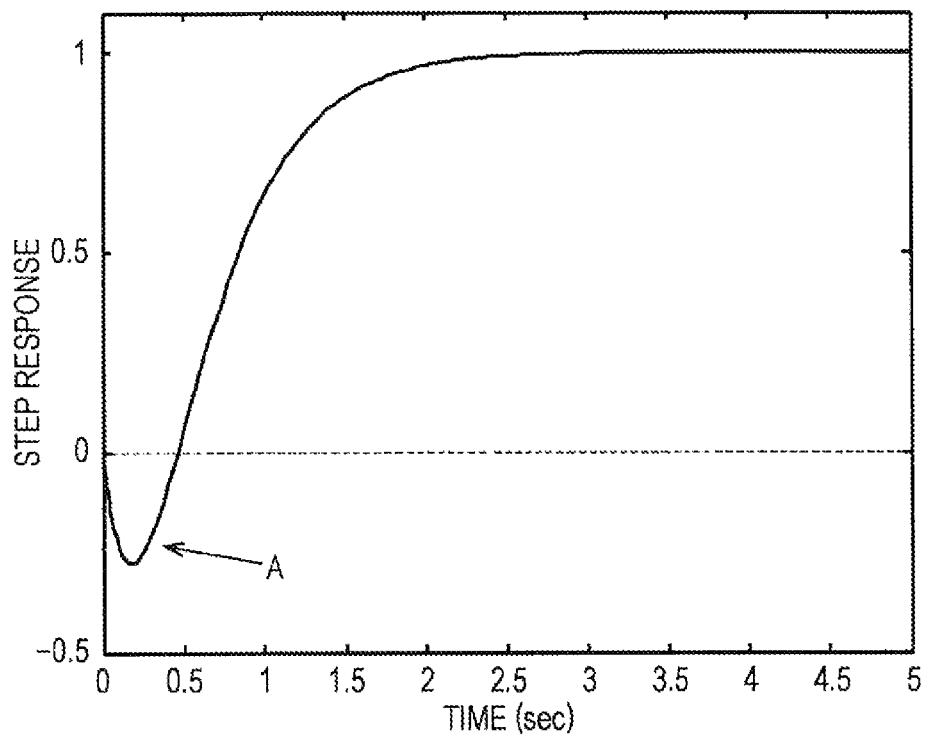
FIG. 1 illustrates an example of step response of an inverse response system.
Figure 2:
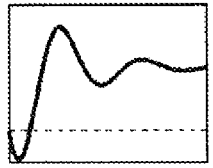
FIG. 2 is a block diagram of an inverse response system.
Figure 2:
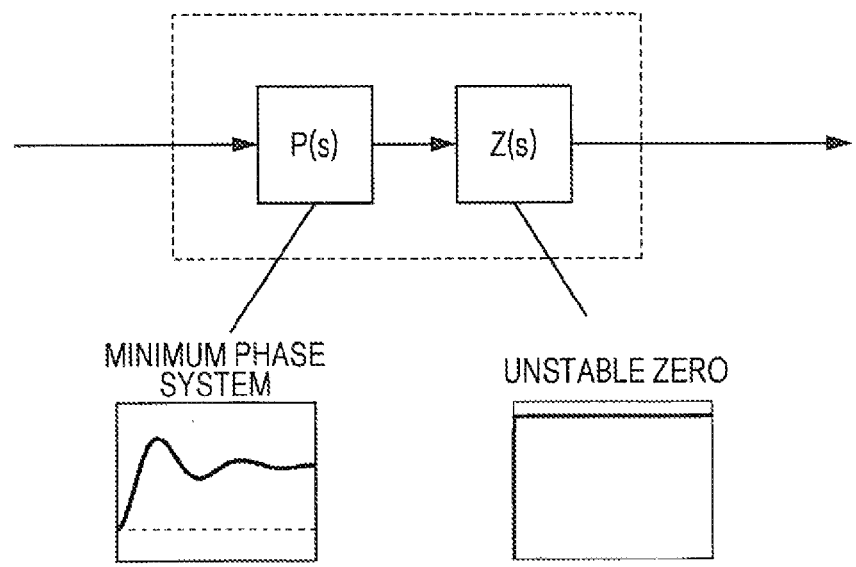

Referring now to the drawings, a control device for an inverse response system (non-minimum phase system including an inverse response system) according to an embodiment of the present invention is described below.

Firstly, before a control device 1 according to an embodiment is described, an inverse response system 2 is described.

Figure 8:
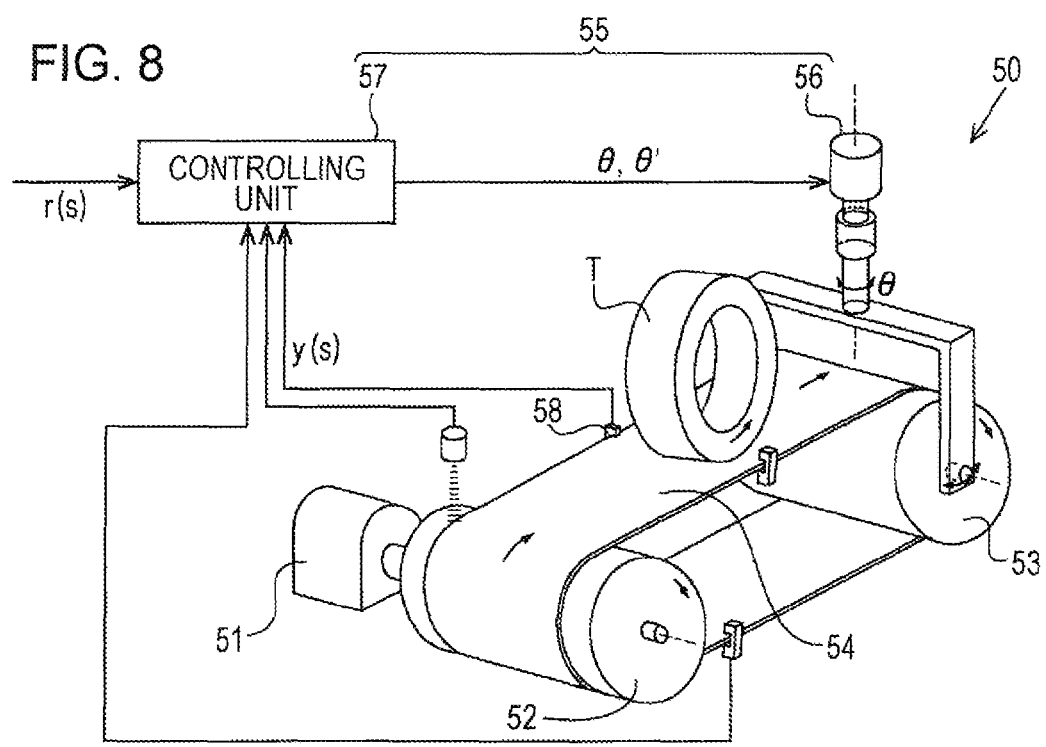
FIG. 8 is a schematic view of a tire running test apparatus.

A typical example of the inverse response system 2 is an apparatus for performing a running test on a tire T disclosed in PTL 1 (Japanese Unexamined Patent Application Publication No. 2010-122006). FIG. 8 illustrates an apparatus 50 for performing a running test on a tire T.

This tire running test apparatus 50 includes a driving drum 52 coupled with a driving motor 51 and rotatable forward and backward, a driven drum 53 disposed so as to be spaced apart from the driving drum 52 and so that the axes of the driven drum 53 and the driving drum 52 are parallel to each other, and an endless belt 54 wound around the driving drum 52 and the driven drum 53. A test tire T is grounded on a road surface (test road surface) formed on a flat surface of the belt 54. The tire running test apparatus 50 can evaluate the running characteristics of the tire T by grounding the tire T on and rolling the tire T over the test road surface of the belt 54.

The tire running test apparatus 50 also includes a belt meandering preventing device 55. The belt meandering preventing device 55 corrects meandering of the belt 54 or displacement of the belt 54 by rocking the driven drum 53, out of the driving drum 52 and the driven drum 53 of the tire running test apparatus 50, with respect to the driving drum 52.

The belt meandering preventing device 55 includes drum rocking means 56 for rocking the driven drum 53 with respect to the driving drum 52 around a rocking axis extending in the vertical direction, and a controlling unit 57 that controls the drum rocking means 56. The drum rocking means 56 can change the position of the belt 54 in accordance with rocking parameters such as the rocking angle θ, the speed of rocking θ', or the rocking force. The belt meandering preventing device 55 rocks the driven drum 53 after the belt position is measured with a sensor 58 or other devices to control the belt position.

Figure 3:
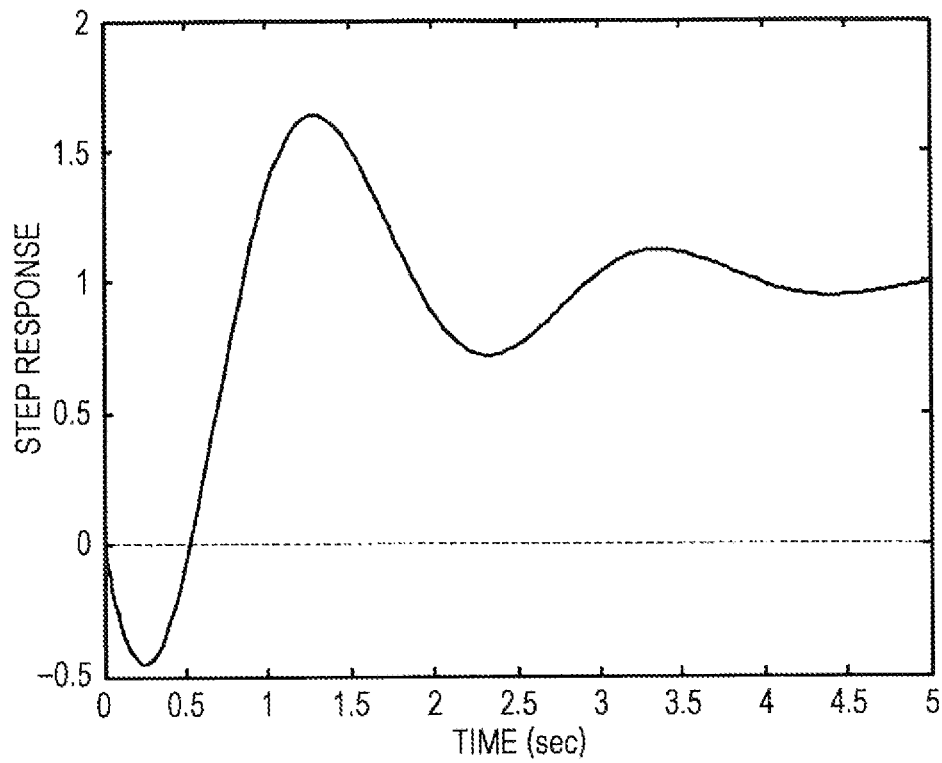
FIG. 3 illustrates another example of step response of an inverse response system.
Figure 4:
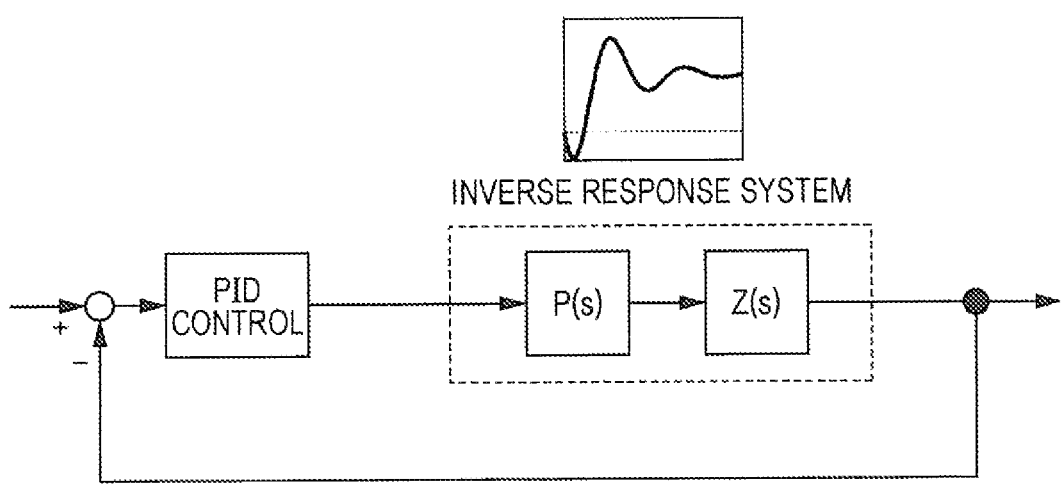
FIG. 4 is a block diagram of PID control performed on an inverse response system.

In a system typified by the tire running test apparatus 50, the effect of the elasticity of the belt 54 or other effects may cause the belt 54 to firstly move in the direction opposite to the commanded direction at the initial timing of response and then move in the direction of the commanded value (see FIG. 1 and FIG. 3). Thus, the system can be regarded as an inverse response system 2.

Figure 6:
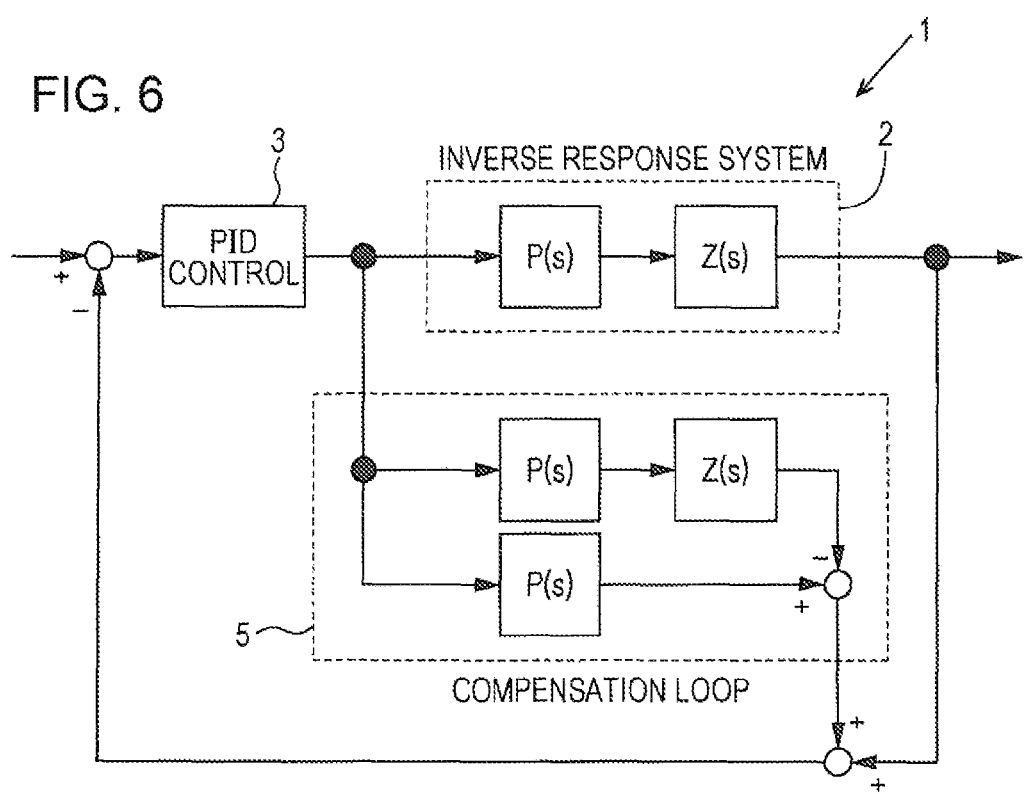
FIG. 6 is a block diagram of a control device according to an embodiment of the present invention.

FIG. 6 illustrates an embodiment of the present invention and is a block diagram of a control system that exhibits the characteristics of the tire running test apparatus 50, that is, an inverse response system 2, and a control device 1 that controls the inverse response system 2.

The inverse response system 2, which is a control target, is constituted by a minimum phase system P(s) and unstable zeros Z(s) into which outputs of the minimum phase system P(s) are input. The minimum phase system P(s) is a system obtained by removing all the unstable zeros Z(s) from the dynamic characteristics of the tire running test apparatus 50. With there being the unstable zeros Z(s), the inverse response system 2 exhibits inverse response characteristics.

Here, P(s) is regarded as a minimum phase system. P(s) does not exhibit an inverse response unless P(s) includes unstable zeros whose response is slower than stable poles of P(s) although it includes unstable zeros whose response is faster. Thus, P(s) is regarded as an approximate minimum phase system that does not include unstable zeros slower than stable poles and at least one or all of the slow unstable zeros is/are integrated into Z(s). Even in this form, the following discussion and the effects hold true.

On the input side of the inverse response system 2, a PID control device 3 is provided for controlling the inverse response system 2. A target input value is input into the inverse response system 2 through the PID control device 3, whereby the inverse response system 2 is controlled.

Besides the inverse response system 2, the control device 1 according to the embodiment includes an inverse response compensation system 5 (compensation loop) conforming to an idea of a Smith predictor (dead-time compensation system). The inventor of the present invention has found that dead time is regarded as one of the unstable zeros Z(s) and achieved the present invention on the basis of the effectiveness of the Smith compensation in dead-time compensation.

As illustrated in FIG. 6, the inverse response compensation system 5 includes two expressions P(s) in parallel and into each of which signals diverging from a value that is to be input into the inverse response system 2 (output of the PID control device 3) are input. An output from a first P(s) is directly output while an output from a second P(s) is input into Z(s). An output from Z(s) is a negative value and added to the output of the first P(s). The signal subjected to addition is added to the output of the inverse response system 2 (control target) and then fed back as an input into the PID control device 3 (negatively fed back). Here, P(s) and Z(s) of the inverse response compensation system 5 are expressed by the same transfer functions as the minimum phase system P(s) and unstable zeros Z(s) of the inverse response system 2.

In short, the inverse response compensation system 5 according to the embodiment removes a portion (P(s)+Z(s)) that reproduces a control target, which is the inverse response system 2, and Z(s) into which at least one or all of the unstable zeros is/are integrated. Thus, the inverse response compensation system 5 according to the embodiment implements PID control independent of the inverse response by adding the improved difference of the control target P(s) to the actual output and then feeding the resultant back to an input side. In other words, the inverse response compensation system 5 calculates a comparison value between an output of a control target (P(s)+Z(s)) and an output (P(s)) of the control target from which at least one or all of the unstable zeros is/are removed and negatively feeds the calculated comparison value (difference) back to an input side of the control target.

The value fed back to the PID control device 3 is the output of the inverse response system 2 itself. Thus, the value is assumed to correspond to a position control loop (control loop of a rocking angle θ) in the tire running test apparatus 50 illustrated in FIG. 8.

Figure 5:
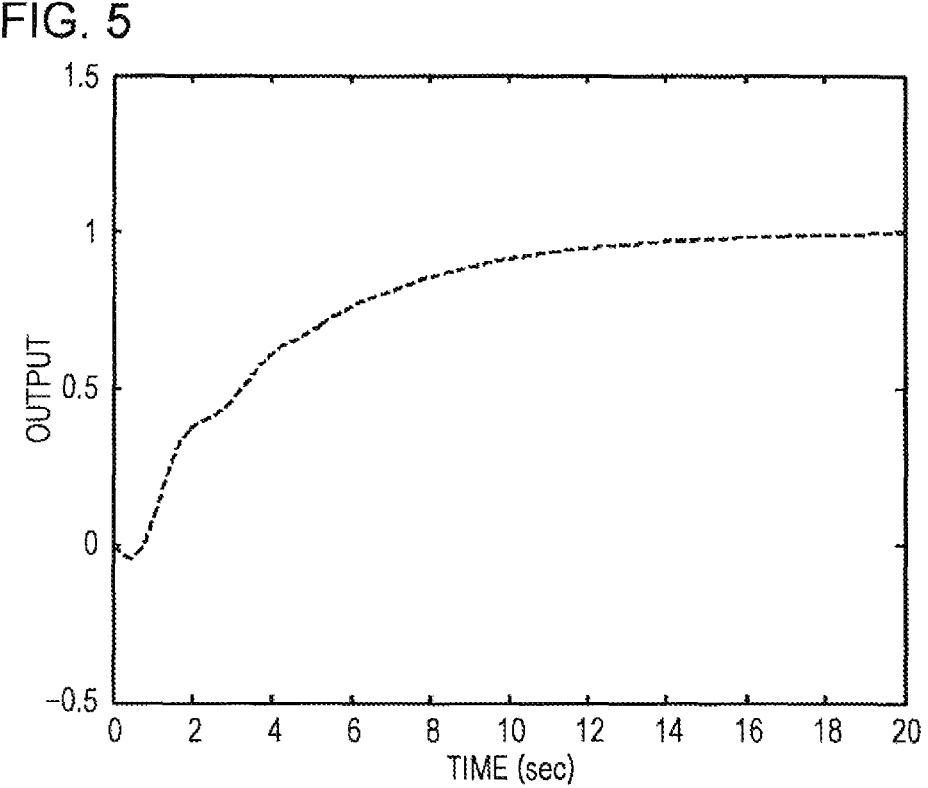
FIG. 5 shows the results of control performed using the control system of FIG. 4.
Figure 7:
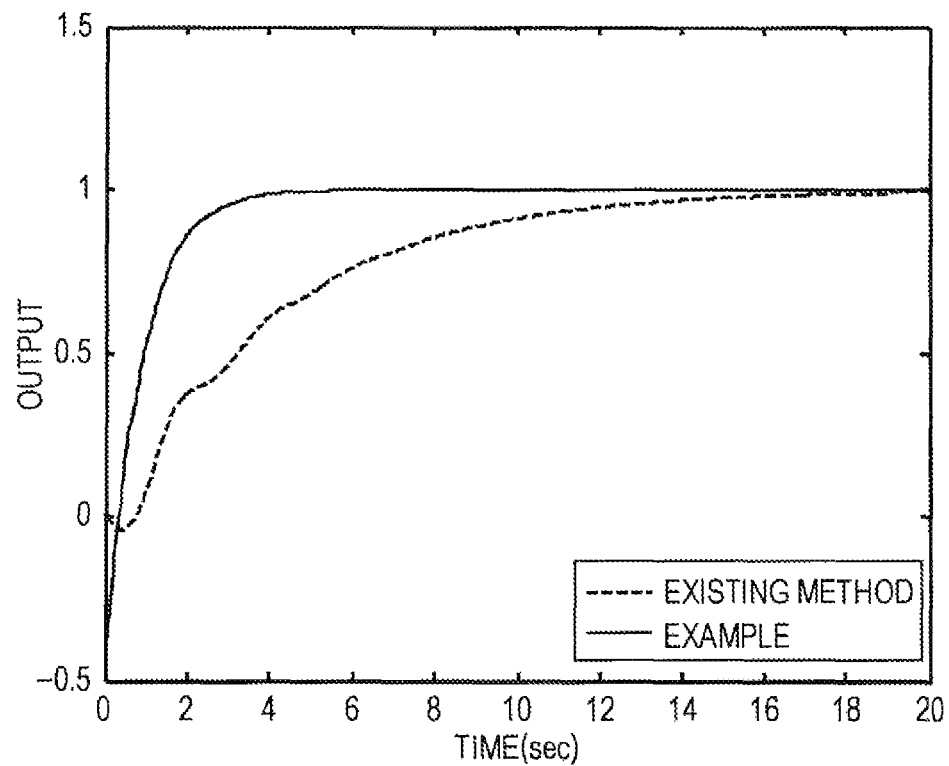
FIG. 7 shows the results of control performed using the control device illustrated in FIG. 6.

FIG. 7 shows results of control performed by the control device 1 according to the embodiment. The control conditions are the same as those in the case of FIG. 5.

Since the embodiment (example) includes the inverse response compensation system 5, the PID control device 3 can reliably perform controls of D control and P control and thus can obtain immediate control response as illustrated in FIG. 7. As illustrated with the response curve illustrated in FIG. 7, the apparatus operates in the opposite direction for an instant immediately after the activation in order to achieve immediate control response. The characteristics of the control target inevitably increase the inverse response in the opposite direction for achieving immediate response. Even if such inverse response occurs, it would negligibly exert the effect when applied to the actual apparatus. On the contrary, the control device according to the embodiment is very effective because it can immediately control the response following the inverse response.

As described above, the control device 1 according to the present invention includes the inverse response compensation system 5. Thus, the control device 1 can have a high control gain and can improve the responsiveness. In addition, the existence of the inverse response compensation system 5 makes the control target a control system free from unstable zeros that exhibit inverse response. Thus, the control device 1 can perform PID control (particularly D control and P control) independently of the effect of the inverse response. Specifically, the use of the control device 1 according to the present invention enables reliable control of the inverse response system 2.

The embodiment disclosed herein is a mere example from every aspect and should be understood as being nonlimitative. Particularly, what is not clearly disclosed in the disclosed embodiment, such as driving conditions, operation conditions, various parameters, dimensions of structures, the weight, or the volume does not deviate from the range within which persons having ordinary skill in the art usually use. The embodiment uses the values easily assumable by persons having ordinary skill in the art.

The control technology of the present invention is not limited to one designed for the apparatus 50 for running test of a tire T and is also applicable to any system expressed by, for example, the inverse response system 2.

The application is related to Japanese Patent Application (Japanese Patent Application No. 2012-229926) filed Oct. 17, 2012, the content of which is incorporated herein by reference.

REFERENCE SIGNS LIST

1 control device
2 inverse response system
3 PID control device
5 inverse response compensation system
50 tire running test apparatus
51 driving motor
52 driving drum
53 driven drum
54 belt
55 belt meandering preventing device
56 drum rocking means
57 controlling unit
58 sensor
T tire

The invention claimed is:

1. A control device for an inverse response system including a minimum phase system and unstable zeros that controls a control target having inverse response characteristics that cause initial response in a direction opposite to a change direction of an input, comprising:
   an inverse response compensation system that compensates for the inverse response characteristics of the control target,
   wherein the inverse response compensation system is configured to calculate a comparison value between an output of the control target in the inverse response system including said minimum phase system and said unstable zeros and an output of the control target in the inverse response system including said minimum phase system and said unstable zeros from which said unstable zeros are removed and to feed the calculated comparison value back to an input side of the control target,
   wherein the control target is a tire running test apparatus that includes an endless belt wound around a pair of drums and a test tire disposed so as to roll over the belt, and
   wherein a rocking angle of the drums or a rocking force of the drums serves as an input of the control target and a position of the belt serves as the output of the control target.

2. The control device for an inverse response system according to claim 1, wherein the inverse response compensation system includes
   a first minimum phase system and a second minimum phase system being connected in parallel and
   unstable zeros being connected with the second minimum phase system in series, and
   the inverse response compensation system is configured such that signals to be input into the inverse response system are input into each of the first and the second minimum phase systems and the output from the first minimum phase system is directly output while an output from the second minimum phase system is input to the unstable zeros and the output from the unstable zeros is added to the output from the first minimum phase system.

3. A control device for an inverse response system that controls a control target having inverse response characteristics that cause initial response in a direction opposite to a change direction of an input, the control device comprising:
   an inverse response compensation system that compensates for the inverse response characteristics of the control target, the inverse response compensation system is configured to
   receive a signal that is to be input into the inverse response system, and
   feed a calculate value back to an input side of the inverse response system;
   wherein the inverse response system includes a minimum phase system and unstable zeros into which output of the minimum phase system is input;
   wherein the calculated value of the inverse response compensation system is a comparison value between an output of the control target and an output of the control target from which at least one or all of said unstable zeros is/are removed,
   wherein the control target is a tire running test apparatus that includes an endless belt wound around a pair of drums and a test tire disposed so as to roll over the belt, and
   wherein a rocking angle of the drums or a rocking force of the drums serves as an input of the control target and a position of the belt serves as the output of the control target.

* * * * *